Patented July 6, 1926.

1,591,132

UNITED STATES PATENT OFFICE.

FORDYCE CHARLES JONES, OF LONDON, ENGLAND.

PROCESS FOR THE TREATMENT OF RUBBER.

No Drawing. Application filed March 5, 1923, Serial No. 623,023, and in Great Britain March 11, 1922.

This invention relates to the treatment of self-vulcanizing rubber solutions vulcanized by any of the usual or suitable processes which normally result in a gel, such, for instance, by the Peachey process, by sulphur chloride and by sulphur or the like. Such solutions possess the disadvantage of setting to gels comparatively rapidly, which prevents their further use as solutions for dipping, moulding, cementing or the like.

I have found that vulcanized doughs can be produced by treating a rubber solution to form a gelling solution as above stated, and then mixing with said solution, before it gels, a suitable proportion of a rubber precipitant such as acetone, alcohol or the like which precipitates a vulcanized dough; moreover, by combining a rubber solvent, such as benzine, naphtha or the like in suitable proportion with the precipitant, and mixing the combined solvent and precipitant with the treated solution before it gels, I find that the gelling action is completely arrested, no precipitation takes place, and a stable and mobile non-gel liquid, properly vulcanized, is the resultant. These astonishing results were not to be anticipated because the addition of a rubber precipitant to ordinary non-vulcanized rubber solutions precipitates a plain or pure rubber, and the addition of solvent by itself to a self-vulcanizing solution, as herein specified, prior to gelling, does not prevent gelling but merely retards it.

The method of procedure is as follows:—

A solution of rubber and sulphur is formed in any usual manner so that, ordinarily, gelling would take place within a period of minutes; the solution is, however, stirred until it thickens towards the gelling point, but remains viscous. At this stage the self-vulcanizing solution is poured into, or has poured into it, an ordinary rubber precipitant such as acetone in sufficient quantity to bring down a precipitate; this is vulcanized rubber dough containing a comparatively small percentage of solvent. Such dough can be moulded, pressed or otherwise worked and then dried, for the production of completely cured rubber articles. The precipitant so added is in excess of the solvent present in the gelling solution in order to produce the dough, but the dough can be made sticky or adhesive by an excess of benzine or the like in the solution after precipitation, or non-tacky by an excess of precipitant. The dough may be kept in the liquid for use at any time.

In the modification whereby there is produced a stable non-gelling vulcanized solution, I make a mixture of acetone and benzine (or equivalents) and prefer to pour the "self-vulcanizing" rubber solution into this. If carefully stirred in, no precipitation takes place but the gelling action is stopped, and the solution remains liquid; when dried out this gives a product of vulcanized rubber. The acetone and benzine could be poured into the solution, but I find the reverse way to be effective in preventing the formation of clots.

As an example of the production of vulcanized doughs and stable liquids according to my invention, I took 100 c. c. of standard 12½% rubber solution, and cured it by the Peachey process, whereby the solution was saturated with sulphuretted hydrogen, following which 10 c. c. of benzine was added, containing sufficient sulphur dioxide in solution to give the desired degree of vulcanization. During the process of gelling, at a period determined by the condition of cure of the resultant product, I added sufficient acetone to bring down the dough precipitate; about 150 c. c. was employed. 200 c. c. can be used to ensure complete separation if necessary.

Taking the same quantity and quality of self-vulcanizing solution, I poured it very carefully and slowly into 100 c. c. of a mixture of one part of acetone and two of benzine, stirring the while, and the resultant was the stable vulcanized solution herein referred to. Ordinary room temperature obtained. It is pointed out that the quantities hereinbefore mentioned may be varied within a large degree, and doughs or solutions, respectively still result; by such means, vulcanized solutions, for instance, of different strengths and qualities may be obtained.

The dough may have the addition of any fillers, colouring matter and the like, and can be kneaded, masticated and finally pressed into shape, and dried off to the desired result.

I claim:—

1. The method of producing a vulcanized rubber dough which consists in first treating a rubber solution to form a self-vulcanized gelling solution, and mixing together said solution, before it sets into a gel, and a suitable proportion of a rubber precipitant whereupon a vulcanized dough is precipitated out, substantially as herein described.

2. The method of treating rubber which comprises treating a solution thereof with a quantity of hydrogen sulfid and sulfur dioxide sufficient to cause jellation thereof in said solution and mixing therewith a quantity of a rubber precipitant to delay jellation.

In testimony whereof I have affixed my signature hereto this 2nd day of February, 1923.

FORDYCE CHARLES JONES.